[19] United States Patent
Moore

[11] Patent Number: 4,468,924
[45] Date of Patent: Sep. 4, 1984

[54] TURBINE ENGINE POWER OPTIMIZATION CONTROL SYSTEM

[75] Inventor: M. Samuel Moore, Northridge, Calif.

[73] Assignee: Semco Instruments, Inc., North Hollywood, Calif.

[21] Appl. No.: 422,863

[22] Filed: Sep. 24, 1982

[51] Int. Cl.³ .............................................. F02C 9/28
[52] U.S. Cl. .................................. 60/39.281; 60/226.1
[58] Field of Search .......................... 60/39.281, 226.1; 364/431.02

[56] References Cited

U.S. PATENT DOCUMENTS

| | | | |
|---|---|---|---|
| 4,185,460 | 1/1980 | Moore | 60/39.281 |
| 4,206,597 | 6/1980 | Larsen et al. | 60/226.1 |
| 4,242,864 | 1/1981 | Corneff et al. | 60/226.1 |
| 4,258,545 | 3/1981 | Slater | 60/226.1 |

Primary Examiner—Louis J. Casaregola
Attorney, Agent, or Firm—Poms, Smith, Lande & Rose

[57] ABSTRACT

Pushbutton controls are provided for the power management of a turbine powered aircraft; and these pushbuttons may be mounted on the aircraft pilot's control handwheel. The turbine engine has a maximum rated permissible rotational speed which initially increases with increasing air temperature and with increasing altitude or reduced pressure; and has an absolute maximum limitation, with this maximum permissible rotational speed decreasing at increasing temperatures starting at about 10 or 15 degrees below zero, centigrade; and these limitations are reduced when supplemental equipment such as de-icing equipment is turned on. In accordance with the present invention, a series of "maps", or rotational speed control characteristics reflecting the factors mentioned above, are provided, and the pushbutton controls select among these characteristics, with the "take-off" power button permitting the highest maximum speeds, etc. In addition, automatic timing to reduce the maximum power levels, such as "Take-Off" power or "Performance Climb" power, is provided, to avoid over-stressing the turbine engines. The system may include additional arrangements for limiting the maximum allowable rotational speed of the turbine engine to a speed below that indicated by any of the "maps", when certain pushbuttons such as the "Approach" pushbutton is actuated.

17 Claims, 12 Drawing Figures

TURBINE ENGINE POWER OPTIMIZATION CONTROL SYSTEM

FIELD OF THE INVENTION

This invention relates to turbine engine control systems, and more particularly to such systems for aircraft use.

BACKGROUND OF THE INVENTION

When turbine engines are over-stressed by operating them at excessive power levels for excessive periods of time, early overhaul of the engines may be required. The complete overhaul of a tubine engine is a very expensive proposition, and for many aircraft can cost from $50,000 to $100,000.

Although maximum rated power for a turbine engine is normally only needed for a few minutes during take-off, some pilots, through carelessness or otherwise, may continue to use maximum power for a substantially longer period of time. This will cause overheating and overstressing of the engine and may result in the need for overhaul after much shorter periods of usage than would normally be required. Under these circumstances, operating costs for the aircraft are greatly increased.

It is also noted that turbine aircraft generally, and turbo-fan engines in particular, have certain maximum rated speeds for the fan section, for example, which are dependent upon altitude and air temperature, in addition to their dependence on the operation of auxiliary equipment such as de-icers. Individual aircraft may have a "map" indicating the maximum allowable RPM, as a function of the air pressure, and also of the air temperature. These characteristics may have a positive slope with increasing temperatures up to a predetermined maximum, and then a negative slope at higher temperatures. The foregoing constitutes an important aspect of the invention as described in my co-pending U.S. patent application Ser. No. 334,552, filed Dec. 23, 1981.

In my U.S. Pat. No. 4,185,460, granted Jan. 29, 1980, I disclosed a push-button power control system wherein pushbuttons were provided to set power levels for "take-off", for "climb", for cruising and for landing "approach" speeds. These pushbuttons were to be mounted on the pilot hand wheel for ease and convenience in pilot operation. However, in the system of U.S. Pat. No. 4,185,460, in continuing actuation of the "take-off" pushbutton, the pilot could continue to operate the plane under maximum power conditions for prolonged periods of time, and thereby overheat and overstress the turbine engines.

A principal object of the present invention is to avoid turbine damage of the type outlined above, and to reduce aircraft maintenance costs by avoiding stressful engine operating conditions.

SUMMARY OF THE INVENTION

In accordance with a broad aspect of the invention, pushbutton power controls are provided for turbine aircraft, and a series of electronically implemented "maps" are provided for a full range of maximum power or speed of rotation limitations. Automatic timed switching from "take-off" or other high power levels, to lower power level conditions is included, to supplement the manual pushbutton controls, thereby encouraging more limited use of high engine-damaging full power modes of operation.

Of course, manual override is always available to the pilot to apply full power under emergency conditions.

In practice, the sequence of operation of the system might be as follows:

Initially, the pilot will depress the "take-off" mode pushbutton type selection switch. Then the pilot might taxi the aircraft to the proper position at the end of the runway for take-off. Then full throttle would be applied for take-off.

The triggering of the timer, for example, for five minutes, occurs as the airplane hits the region of maximum power on the applicable "map". After the passage of five minutes, which is normally adequate for take-off, there is an automatic downshift to the next lower "map", corresponding to the "Performance Climb" for example, and an appropriate indicating signal such as an LED will be energized. Alternatively, the pilot, following initial take-off, might manually energize the selection switch for "Performance Climb" and then he would shift to this new "map" with lower maximum power ratings, at an earlier point in time, before the five minute automatic down-shift. This shift to the "Performance Climb" map would initiate a second timing cycle, perhaps for 20 minutes, and the system would automatically shift to a lower power "map" following the passage of this additional period of time, or at such point in time as the pilot depresses the "maximum cruise" pushbutton or selection switch, or one of the other pushbuttons relating to lower power levels. Accordingly, the implementing system includes electronic logic circuits for providing the alternate mode for shifting to the reduced power "maps" either through automatic timing or by the manual depressing of one of the pushbuttons which may be located on the pilot handwheel.

Other objects, features and advantages of the invention will become apparent from a consideration of the following detailed description and from the accompanying drawings.

DETAILED DESCRIPTION

Figure 1A:
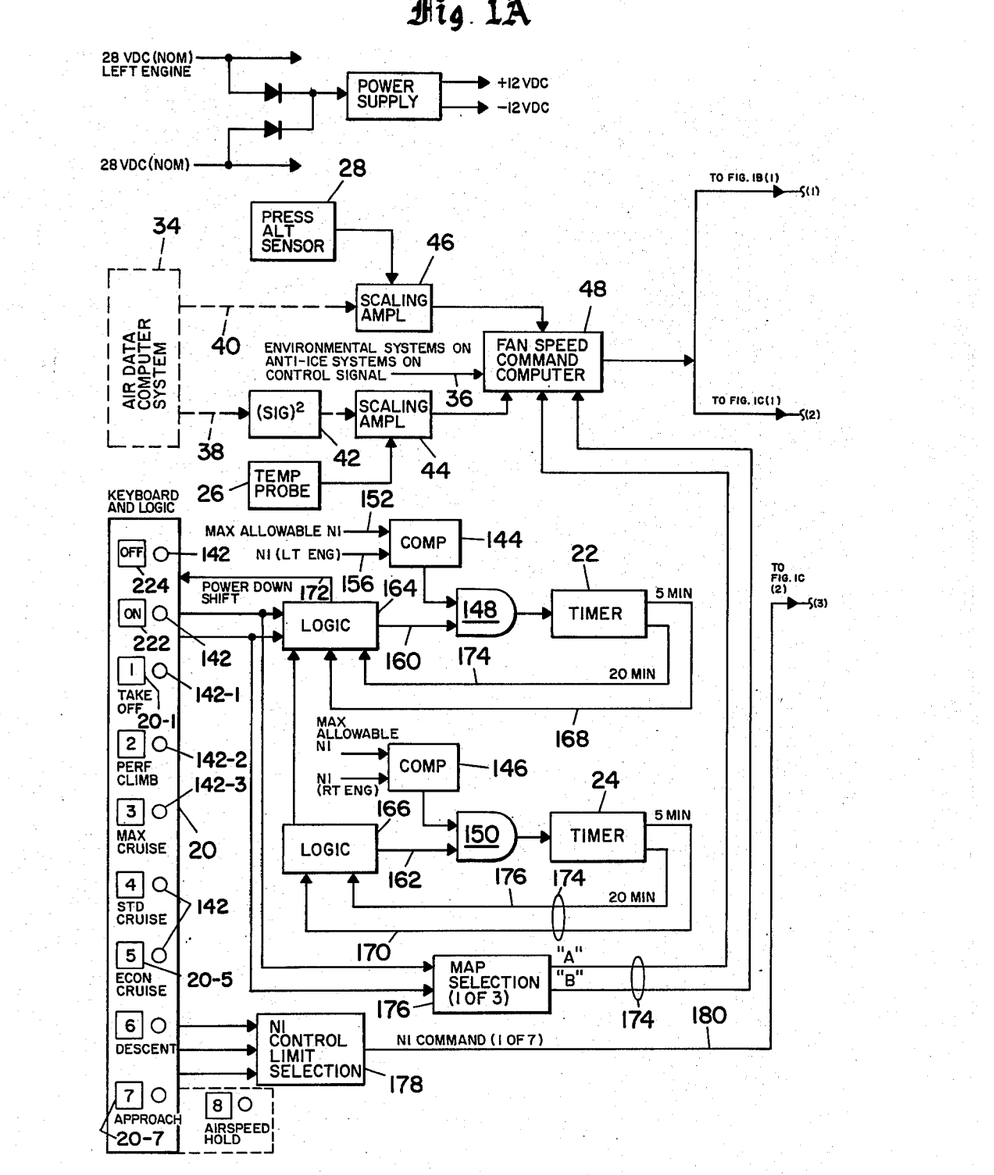
FIGS. 1A to 1C together form is a block diagram illustrating the principles of the present invention as applied to a two-engine turbofan powered aircraft.
Figure 1B:
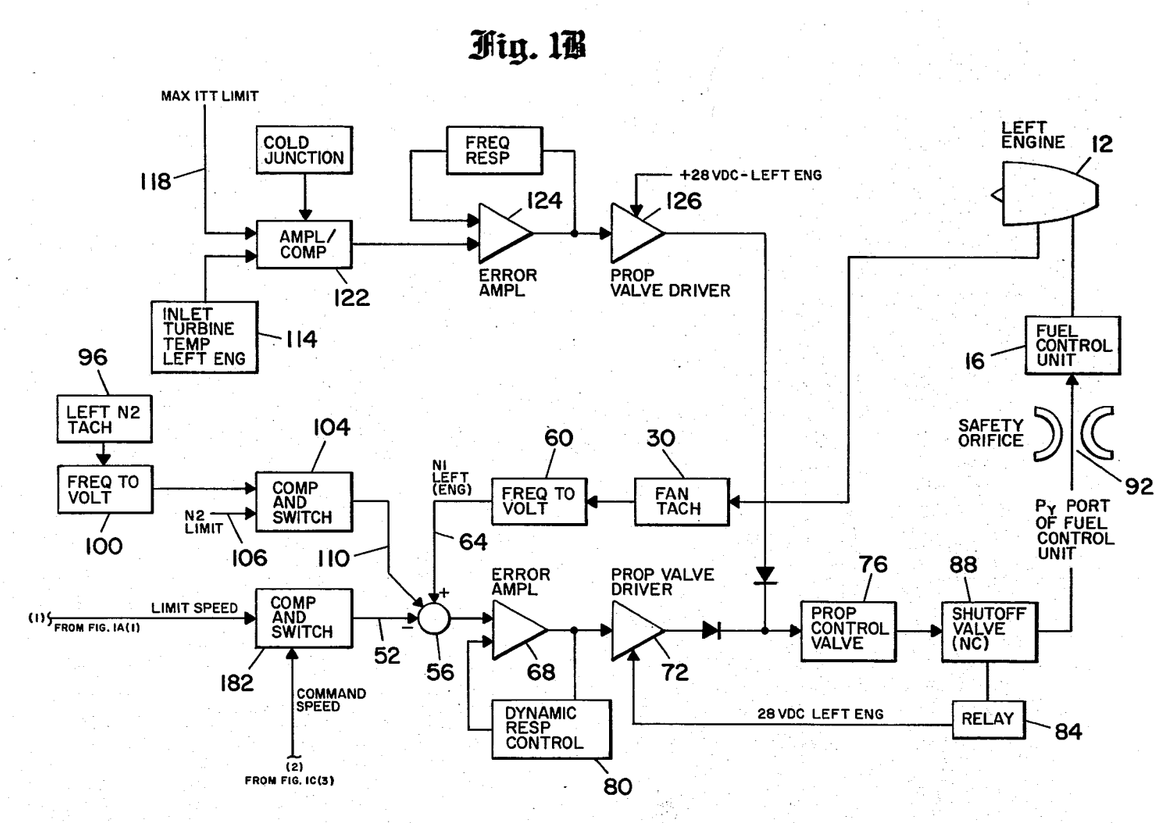
Figure 1C:
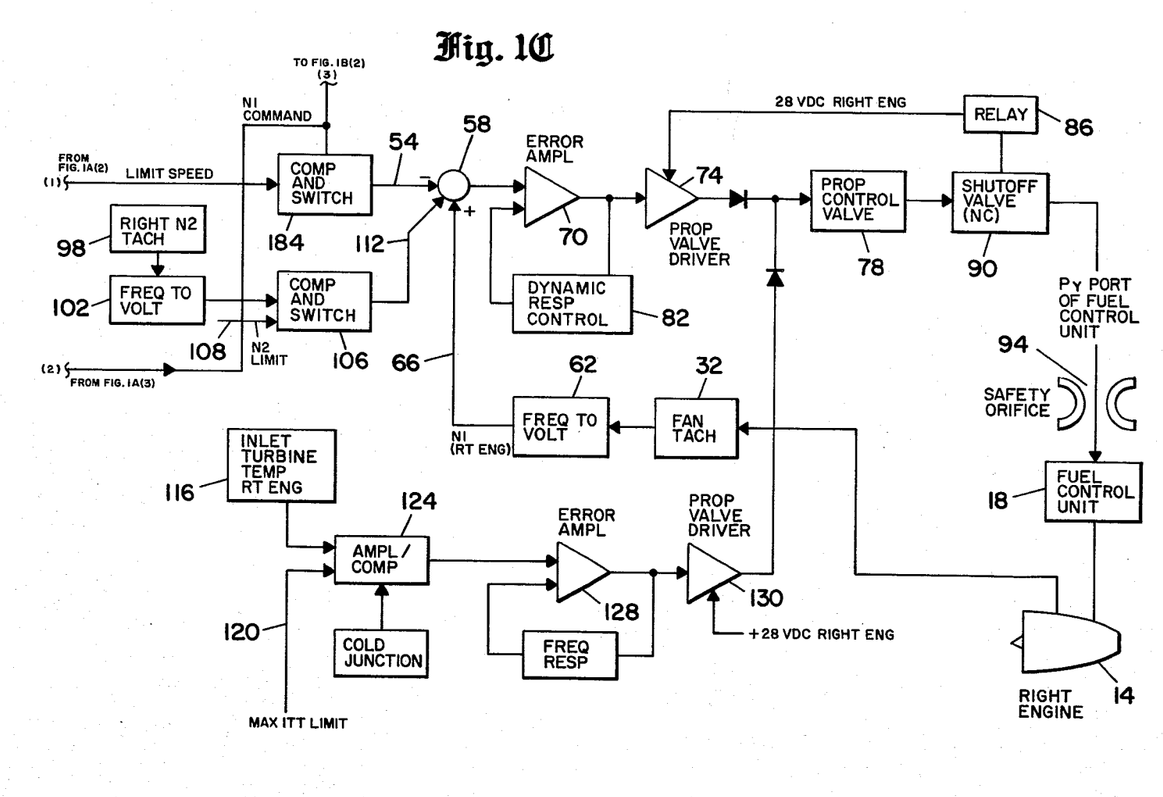

Referring more particularly to the drawings, FIG. 1 shows two turbofan jet engines 12 and 14 which are to be controlled by signals applied to the fuel control units 16 and 18, respectively. Now, the permissible fuel supplied to the jet engines 12 and 14 will be a function of the ambient temperature, and the pressure or altitude, all as determined by the graphs included in FIGS. 4 through 6 to be discussed below, and also will be a function of the particular pushbutton 20-1 through 20-7 on the control panel 20 which has been actuated, with these controls appearing at the lower left-hand side of FIG. 1. An additional factor will be the automatic down shifting of power under the control of the timer circuits 22 and 24 as shown in the logic circuitry associated with the control panel 20.

Additional inputs to the system include the output from the temperature probe 26 and the pressure and altitude sensor 28, as well as the fan tachometers 30 and 32 associated respectively with the engines 12 and 14. Alternatively, instead of the temperature probe 26 and the pressure sensor 28, the same information may be available from an air data computer 34, and inputs from the air data computer 34 may be employed in place of the direct inputs from the temperature probe 26 and the pressure sensor 28. One additional input is from lead 36 which indicates whether parasitic or subordinate equipment, such as the anti-ice systems, are on or off. Incidentally, the temperature signal from the air data computer appears at lead 38 and the pressure or altitude signal at lead 40. Because the air data computer signal is normally the square root of temperature, the electronic squaring circuit 42 is provided so that the input temperature scaling amplifier 44 is the same both for the direct temperature probe input and also for the signal from the air data computer.

Figure 7A:
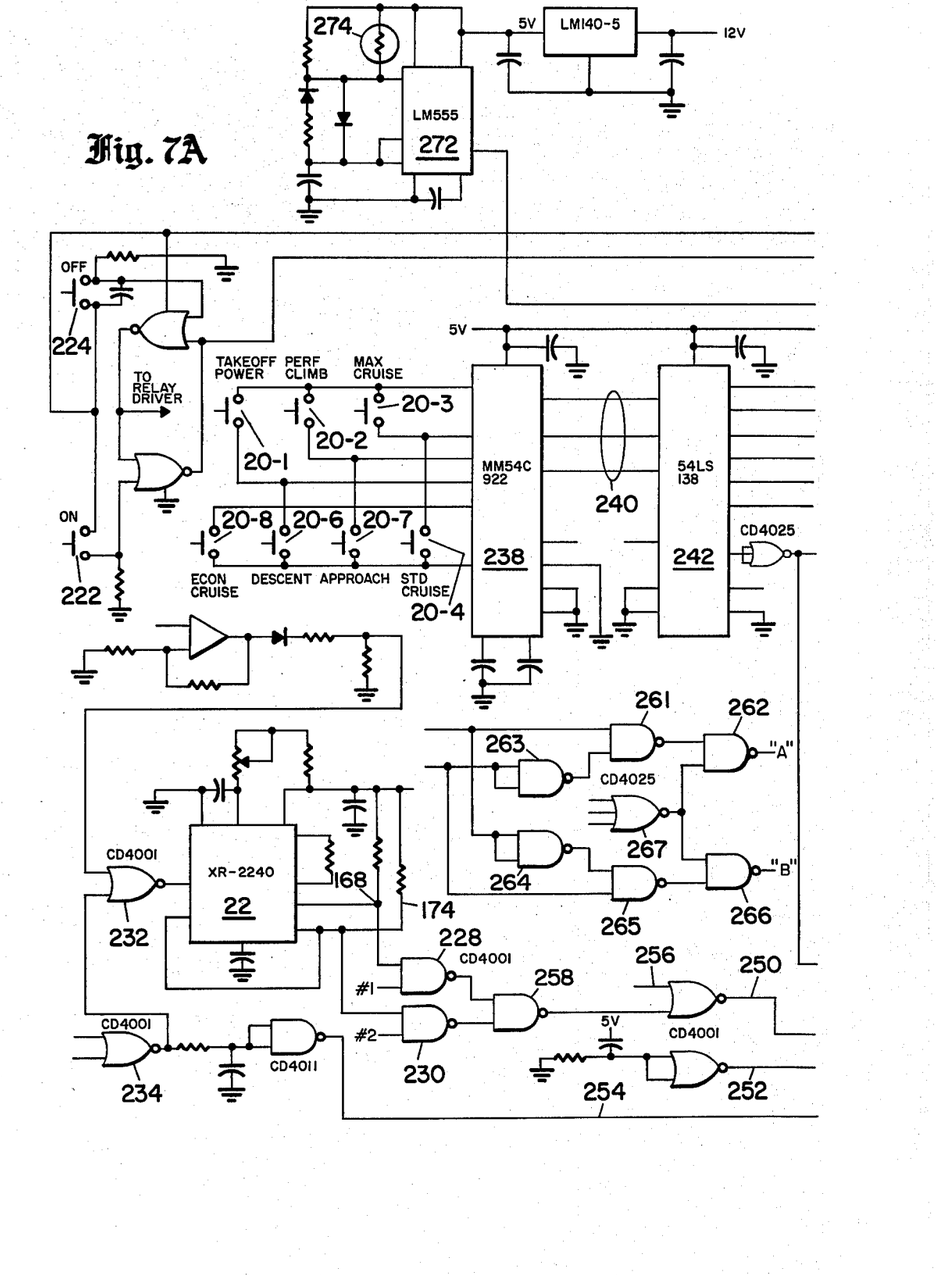
FIGS. 7A and 7B are a logic block circuit diagram for the electronics which could be employed in the implementation of the present invention.
Figure 7B:
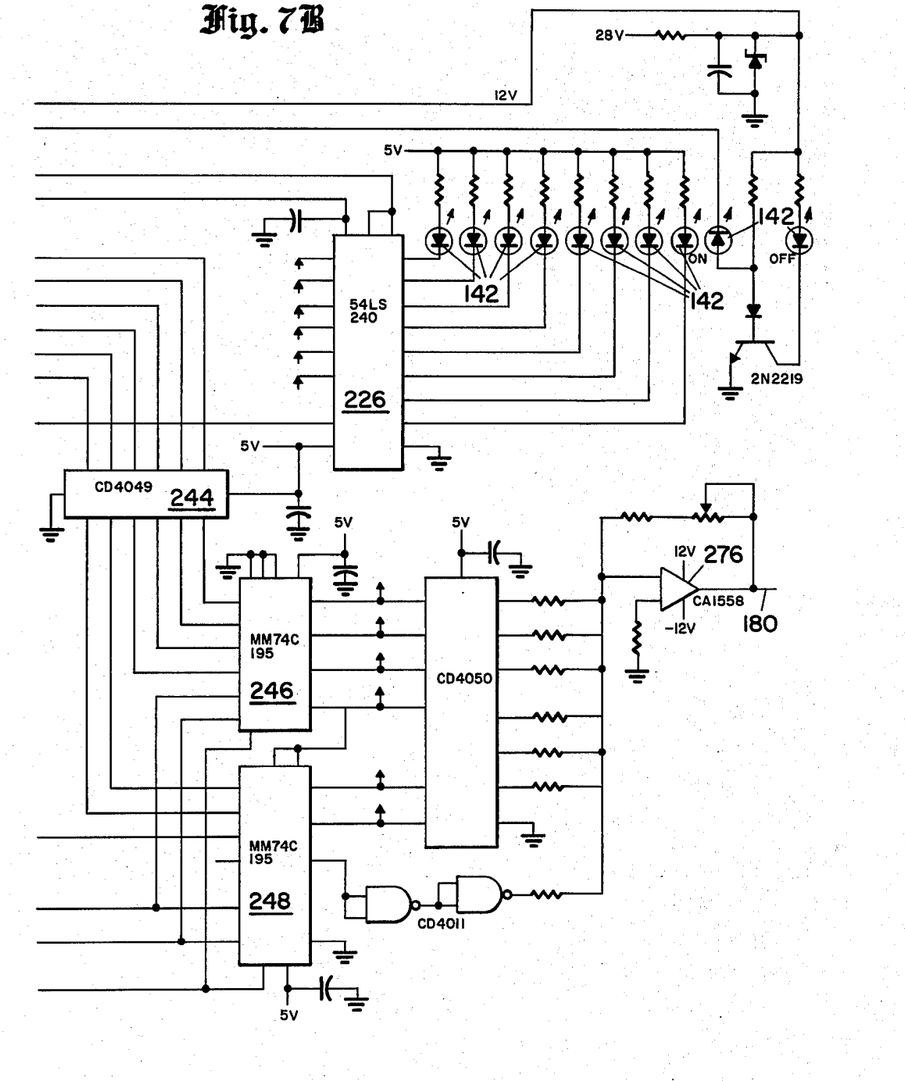

The scaling amplifier 46 for the pressure signal from sensor 28 appears as one input to the fan speed command computer 48, with greater detail of this circuitry being shown in FIGS. 7a and 7b.

In a basic mode of operation of the fuel control servo loop (FIG. 1B), a scaled voltage representing the maximum permissible fan speed appears at leads 52 and 54 at the input to the summing points 56 and 58, respectively. The tachometer input from circuits 30 and 32 are scaled to an appropriate voltage level by the circuits 60 and 62, respectively, and are also applied to the summing point 56. In the event that the actual speed of rotation of one of the fans as indicated on leads 64 or 66, for example, exceeds the calculated maximum (developed as discussed below) on leads 52 and 54, an input signal is supplied to the operational amplifier 68 or 70, as the case may be, the signal is amplified by the proportional valve driver amplifiers 72 and 74, to operate the proportional control valves 76 and 78, to bleed pressure from the fuel control units 16 and 18, respectively, thereby reducing the fuel flow to the engines 12 and 14, and thus reducing the rotational speed of the fan section of the turbofan engines 12 and 14 to the calculated level indicated by computer 48, and supplied to the summing point 56 on lead 52.

Suitable lead/lag response control networks 80 and 82 avoid unduly fast response of the system, and the oscillation or hunting which might otherwise occur in the servo loop. Also, when the computer system of the present invention is turned on, the relays 84 and 86 are operated, and the normally closed shutoff valves 88 and 90 are opened, thereby permitting the controlled bleed-off of pressure by the proportional control valves 76 and 78. Accordingly, the arrangements are "fail-safe", in which, when the system is turned off, the shutoff valves 88 and 90 positively disconnect the system from affecting the fuel control units 16 and 18, and full manual control of the throttle is restored to the pilot. The safety orifices 92 and 94 eliminate the initial dropoff of power, which might otherwise occur upon turn-on of the system as a result of a rush of air with a sudden pressure drop at the inputs to the fuel control unit 16 and 18.

The normal mode of operation of the system is as described above, with the fan speed being held to limits established by the signal at input lead 52 and 54 to the summing point 56 and 58. In addition, under some operating conditions, the turbine speed of rotation may exceed desired limits, and under certain other conditions, the inlet turbine temperature may reach dangerously high levels. With regard to the turbine speed of rotation, it is determined by the N-2 tachometers 96 and 98, and these tachometer signals are scaled to a suitable voltage level by the circuits 100 and 102, respectively. The maximum permissible rotational speed for the turbine is supplied to the comparison circuit 104 and 106 on leads 106 and 108, respectively. When the actual turbine speeds exceed the rated limits, a signal is supplied on leads 110 or 112 to summing point 56 or 58, with the same result, of reducing the fuel flow to the left or right engine where the limits are being exceeded.

In a similar manner, the inlet turbine temperature as sensed at thermocouples 114 and 116 are compared against limits supplied on leads 118 and 120, and if the inlet turbine temperature is above limits, as determined by the amplifier/comparator 122 or 124, the error signal is amplified in circuits 124, 126 or in circuits 128, 130, and the proportional control valve 76 or 78 is actuated accordingly, to reduce fuel flow to the engine.

Now, consideration will be given to the pushbuttons 20 at the lower left corner of FIG. 1, and to the associated logic circuitry included in and associated with the block 20. Incidentally, the pushbuttons need not be physically depressed, but may be just "touch" type, and the light-emitting diodes, or LED's 142 indicate which pushbutton is controlling. In this connection, one of the two LED's, 142, associated with the off and on buttons is energized; and only one of the seven lower pushbuttons will be energized at any one time, and accordingly, only one of the seven LED's associated with these lower pushbuttons will be turned on to indicate the active pushbuttons.

Now, in operation, the pilot initially touches the "on" pushbutton included in circuit 20, and then touches the "Take-Off" power pushbutton. Then, as mentioned above, he may taxi around the airport to the end of the runway, before applying full power to the engine. The timer circuits 22 and 24 are then initiated by the comparator circuits 144 and 146 operating through the "AND" circuits 148 and 150. Inputs to the comparator circuits 144 and 146 include a voltage representing the maximum allowable fan speed, on lead 152 for the left engine, and on lead 154 for the right engine. Then, when the actual speeds of rotation for the fan reach the preset levels, as they are applied to leads 156 and 158, an output signal from the comparators 144 and 146, in combination with an enabling signal on leads 160 and 162 from logic circuits 164 and 166 turn on the timer circuits 22 and 24.

The timer circuits 22 and 24 allow five minutes for full power during takeoff, and then automatically supply signals on leads 168 and 170 to logic circuits 164 and 166, causing energization of the power downshift input 172, automatically shifting control from the "Take-Off" mode to the "Performance Climb" mode, and this is indicated by the energization of the LED 142-2 adjacent the "Performance Climb" pushbutton, and the turnoff of the LED 142-1 adjacent the "Take-Off" pushbutton.

Similarly, after a 20-minute interval in the "Performance Climb" mode, the output leads 174 and 176 from the timer circuits 122 and 124, are energized, and control is shifted to the normal power mode, represented by energization of the "Maximum Cruise" pushbutton and the energization of the LED designated 142-3.

Figure 4:
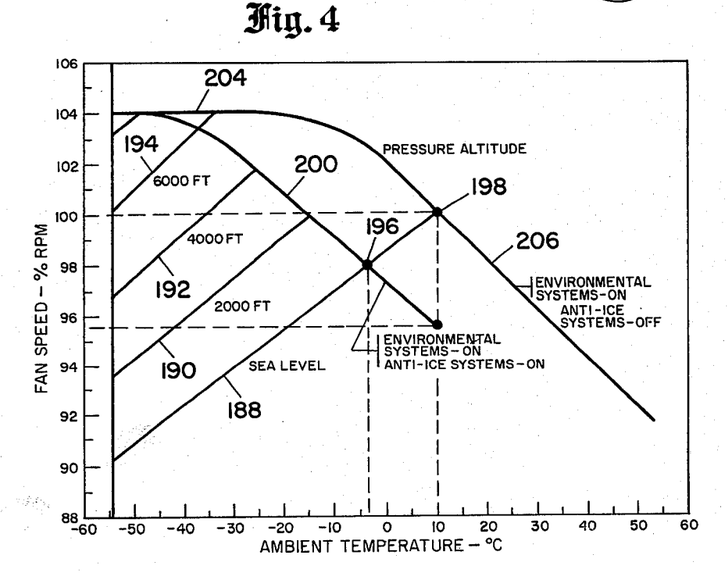
FIGS. 4, 5 and 6 are "maps" or plots of maximum permissible fan speed for predetermined pressure, temperature and other conditions, for a typical turbofan engine.
Figure 5:
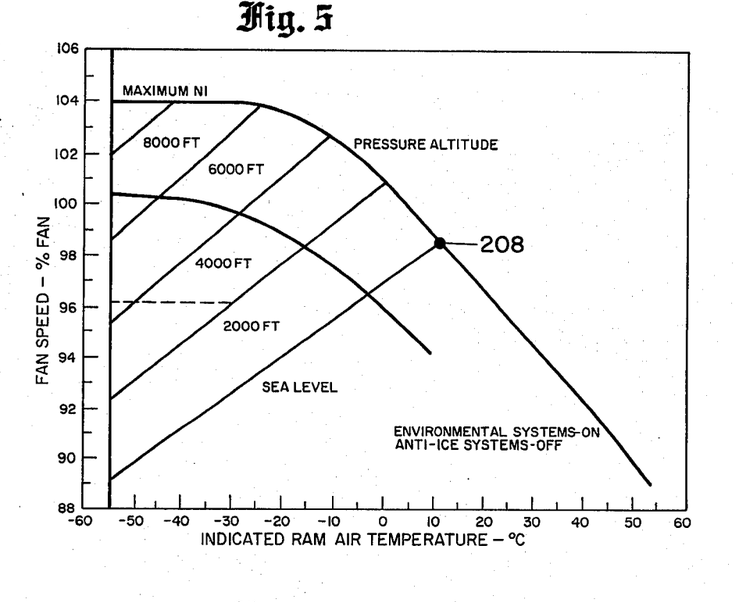
Figure 6:
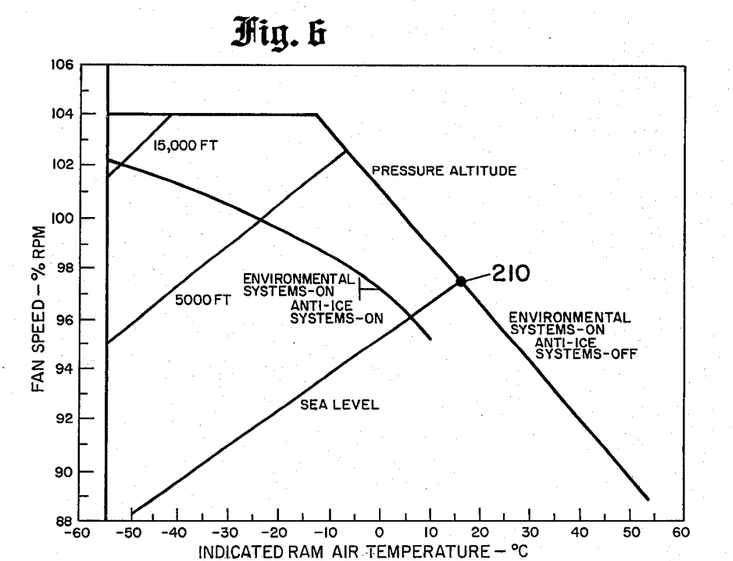

As mentioned above, there are three "maps" which appear in FIGS. 4, 5 and 6, and which represent maximum speed functions for different power levels, given certain ambient temperature and pressure or altitude conditions. These maps are included within the fan speed command computer 48 and their selection is determined by the signals supplied to the leads 174 by the logic map selection circuit 176. Similarly, the maximum permitted value for the fan speed, which may be further limited (below levels shown on the "maps") when the lower power levels are selected by the pushbuttons, is determined by the logic circuit 178 which supplies a signal level over lead 180 to the circuits 182 and 184, which select the lower of the two input signals, and supplies this lower control signal on leads 52 and 54 to the summing point 56 and 58, respectively.

Figures 2, 3:
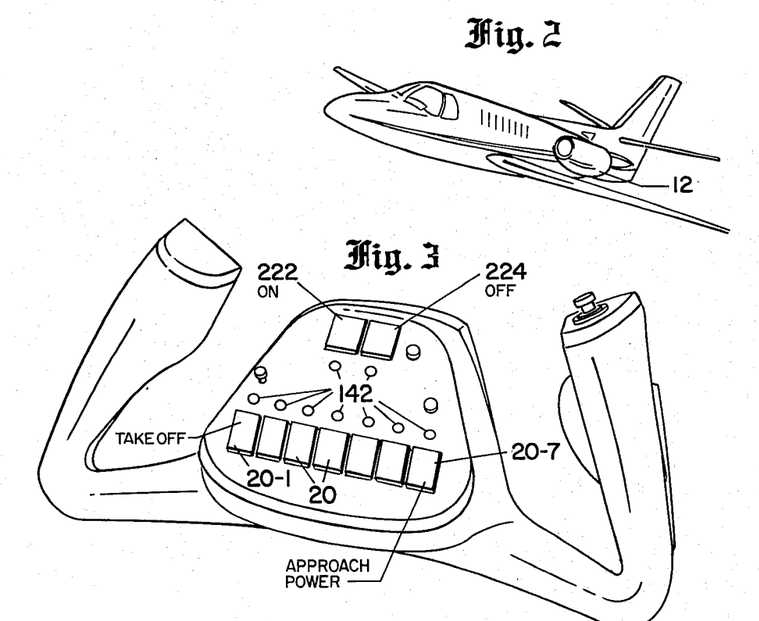
FIG. 2 illustrates the type of aircraft to which the present invention is applicable.
FIG. 3 shows a pilot handwheel equipped with pushbutton controls.

FIG. 2 is included only for completeness to show the typical twin engine fan jet, where the left engine 12 may be the engine 12 which appears at the upper right-hand side of the circuit of FIG. 1B.

Turning now to FIG. 3, it shows the pilot's control handwheel for the aircraft of FIG. 2. Incidentally, the pushbuttons included in unit 20 of FIG. 1, as well as the light-emitting diodes 142, are also shown in FIG. 3.

Attention will now be directed to the plots of FIG. 4 which relate the rotational fan speed to the temperature, and altitude or pressure. At the left-hand side of FIG. 4 the fan speed is given in terms of percentage of the rated speed. For the purposes of FIG. 4, and in the case of the Cessna Citation two engine aircraft using Pratt & Whitney JT-15D engines, 100 percent corresponds to approximately 15,900 revolutions per minute. Along the bottom of FIG. 4, the input temperature to the engine is indicated in degrees centigrade, and this scale extends from −60 degrees centigrade up to +60 degrees centigrade, with 0 degrees centigrade being the freezing temperature for water in the centigrade or Celsius system. With regard to the plots included in FIG. 4, it may be noted that the plot 188 relates maximum fan speed to air temperature at sea level, while the level 190, 192 and 194 provides similar characteristics for pressures or altitudes corresponding to 2,000 feet, 4,000 feet and 6,000 feet, respectively.

Reference will now be made to two points 196 and 198 which appear on the "map" of FIG. 4. Considering first point 198, this involves a temperature of about 10 degrees centigrade, and operation at sea level. As indicated at the far left, in FIG. 4, this corresponds to about 100 percent of the rated fan speed, or in the case of the particular engine under consideration, 15,900 revolutions per minute. Incidentally, it may be noted that the point 198 relates to the anti-ice systems being off. The intersection of the sea level pressure curve 188 with characteristics 200 involving the anti-ice systems being on, occurs at point 196. As indicated by the intercepts of point 196, this corresponds to a temperature of about −4 degrees centigrade and a rotational speed of about 98 percent of the rated speed, or approximately 15,582 revolutions per minute. In the event that the temperature is +10 degrees centigrade, and if the anti-ice system still happened to be energized despite the above freezing temperature, the maximum RPM is indicated by point 202, and the maximum rotational speed is about 95.5 percent of full rated speed.

Now, in reviewing the overall characteristics of FIG. 4, it may be noted that, in addition to the positive substantially linear characteristics given by plots 188, 190, 192 and 194, certain other limits come into play. First, there is the absolute maximum as indicated by the horizontal line 204 at 104 percent rated fan speed. In addition, we have the downwardly sloping maximum characteristics 200 and 206 which show reduced maximum allowable fan speed rotation with increasing temperatures. From a physical standpoint, this means that the hotter the ambient air is, the lower the maximum rotational speed that is permitted. It may also be noted that the limits are significantly lower when the anti-ice systems are on, than when they are de-energized.

FIGS. 5 and 6 are generally similar to FIG. 4, but provide somewhat reduced allowable power as compared with the maximum limits as shown in FIG. 4. Thus, by way of example, the maximum fan speed rotation permitted at sea level in FIG. 5, is indicated at point 208, and this is approximately 98.7 percent of full rated power, as compared with approximately 100 percent permitted in accordance with the map of FIG. 4. Similarly, in the characteristic of FIG. 6, the corresponding point 210 indicates approximately 97.5 percent of full rated fan speed, which is the next step in the reduction of rated speed, as compared with FIG. 5.

In my co-pending U.S. patent application, Ser. No. 334,552, filed Dec. 28, 1981, one illustrative detailed circuit for implementing the map of FIG. 6 was set forth. That circuit included a resistive network, with pressure and temperature as certain of the inputs to the circuit, and with the limits as set forth in FIG. 6 being defined as a result of these pressure and temperature inputs, as well as the indication as to whether the anti-ice systems were on or off.

Turning now to the circuit of FIGS. 7A and 7B, it shows certain details which are included broadly in the block diagram of FIG. 1. More specifically, with reference to FIGS. 7A and 7B, it shows the "On" switch 222 and the "Off" switch 224, as well as the seven power mode switches 220-1 through 220-7 at the far left in FIG. 7A. In addition, the light-emitting diodes 142 are all shown in the upper right in FIG. 7B, while the LED drivers are included in block 226.

Incidentally, in regard to the simpler logic circuit included in the diagram, "AND" circuits are indicated by blocks with a rounded front and a flat rear, with typical AND circuits being shown at reference numeral 228 and 230. Incidentally, the very small circles at the output of the AND circuits 228 and 230 indicate that the polarity is reversed at the output, and accordingly, these are known as "NAND" circuits, representing an AND circuit followed by an inversion. Similarly, "OR" circuits are indicated by somewhat pointed blocks with a curved rear portion. Typical OR circuits are indicated by reference numerals 232 and 234. Again, the small circles at the output of these blocks indicates inversion of the polarity of the output, and accordingly the circuits are sometimes referred to as "NOR" circuits.

In considering the circuit of FIGS. 7A and 7B, it is useful to go through the sequence which occurs when the system is turned on, the pushbutton 20-1 is depressed, and the system switches over from "Take-Off"

power to "Performance Climb" power, after the expiration of five minutes. First, the timing circuit 22 appears toward the lower left in FIG. 7a. This circuit may be an EXAR circuit 2240, although other comparable timer circuits are available. The five-minute and the 20-minute output leads 168 and 174, respectively, extend to the AND gates 228 and 230, respectively.

Initially, when the system is turned on, the switch 222 is depressed. The next step would be the depressing or the touching of switch 20-1 representing "Take-Off" power. The signal from the switches is registered in the binary latching and selection circuit 238 and transferred to an octal output signal on leads 240. The circuit 242 performs an octal to decimal conversion, and energizes one of the output leads which appears to the right of this circuit. These decimal output signals are routed to the buffer 244 and then to the pair of shift registers 246 and 248. The output from the shift registers 246 and 248 are coupled to the inputs which appear to the left of the LED driver circuitry 226 to thereby energize the appropriate LED's. These LED's are of course actually physically associated with their related pushbuttons as indicator lights.

Now, returning to the shift registers 246 and 248, they are controlled by the leads 250, 252 and 254. The last-mentioned lead permits either the shifting of the control digit through the shift register or the loading of information is parallel into the shift register, depending on its state. The lead 252 clears the shift register upon start-up. The lead 250 is the "clock" input, which either permits the entry of data when the data available lead 256 is energized, and lead 254 is in the proper state; or permits down-shifting of power in the system upon receipt of a pulse from the AND gate 258, when the lead 254 is in the "shift" state.

Map selection is accomplished by the AND gates 261 through 266 and the OR gate 267 which derives signals from the state of the pushbutton switches, and produces a binary output signal pair designated A, B. More specifically, when the "Take-Off" pushbutton and associated LED 142-1 has been actuated, Q-0 is active, and the other inputs are inactive. This provides an output signal at lead A, resulting in the selection of Map No. I as shown in FIG. 4 of the drawings. When only Q-1 is energized, conforming to "Performance Climb", only lead B is energized, conforming to the selection of Map II as shown in FIG. 5. However, when neither input Q-0 or Q-1 are energized, but one of the other pushbuttons is energized, then both outputs A and B are energized, selecting Map III corresponding to FIG. 6 of the drawings, as discussed above.

A minor circuit also shown in FIG. 7A adjusts the level of intensity of the LED's 142. This circuit which appears at the upper left in FIG. 7A includes the oscillator 272 which has its duty cycle controlled by the cadmium sulfide light sensor 274. Under reduced light conditions, for example, at night, the duty cycle of the oscillator 272 is shifted so that the LED's are less brilliantly illuminated, thereby providing uniformity of dashboard illumination.

Incidentally, most of the circuit components illustrated in FIGS. 7A and 7B are conventional and may be purchased from any of several semi-conductor manufacturers in accordance with the numbers which appear on the drawings. Concerning the binary latch selection circuit designated by Part No. MM54C922, it is understood that it is available from National and Mitel, for example.

The operational amplifier 276 provides the pilot controlled speed limit command on lead 180, as shown in FIG. 1 leading to the circuits 182 and 184. The voltage level of the command signal on lead 180 is dependent on the selection of the resistors R1 through R6 which are brought into play by the appropriate energization of the output leads Q-0 through Q-5 depending on energization of the selected pushbutton in unit 20.

Figures 8, 9:
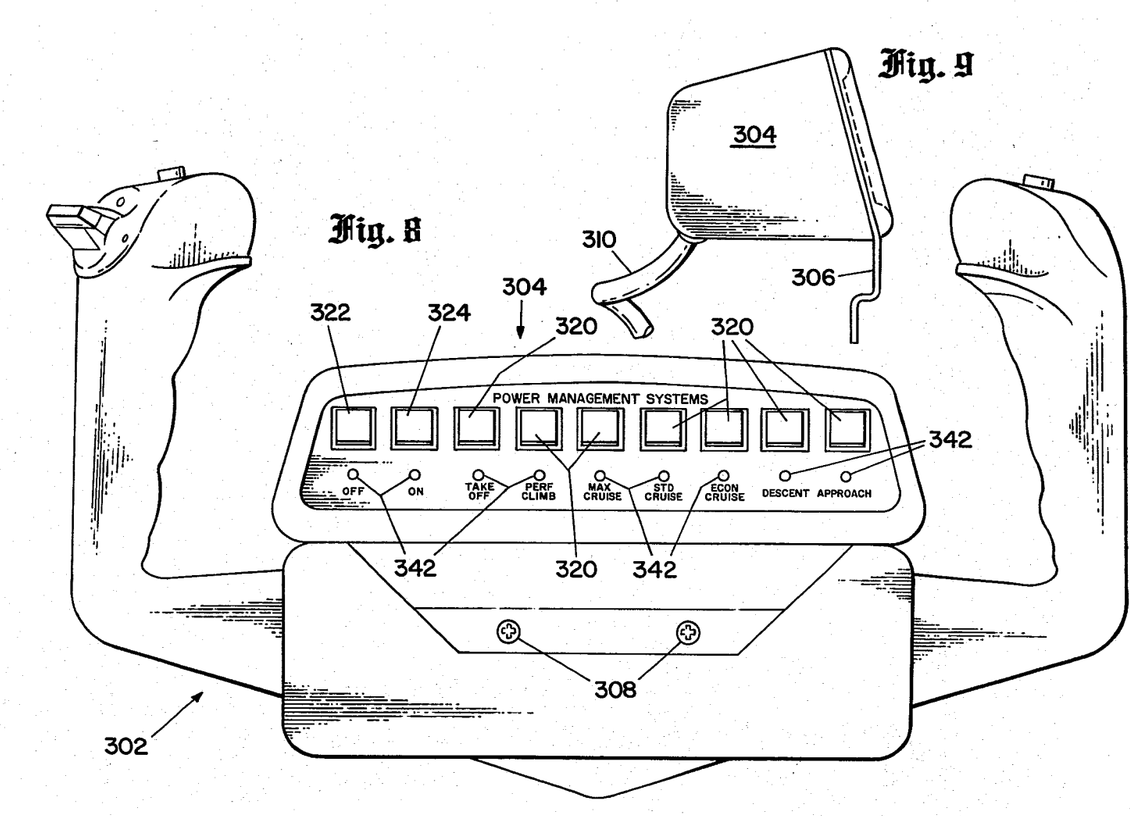
FIG. 8 is a showing of an alternate installation on a pilot handwheel.
FIG. 9 is a separate side view of the manually operable switch and control unit shown in FIG. 8.

FIGS. 8 and 9 show an alternate installation arrangement, as compared with that shown in FIG. 3. In FIG. 8 the pilot handwheel assembly 302 is provided with the power management and optimization unit 304. Manually operable "off" switch 322 and "on" switch 324 are provided, in addition to the selective power control switches 320, which serve the functions as described hereinabove for the manually operable switches 20-1 through 20-7. Light emitting diodes 342 indicate which of the manually operable switches have been selected.

FIG. 9 is a side view of unit 304, showing the bracket 306 by which it may be secured to the pilot handwheel 302, by screws 308 as shown in FIG. 8. Electrical connections to the unit 304 are included in cable 310.

In the foregoing description, emphasis has been placed on the servo control of the fan speed or the turbine speed. It is to be understood that the system could be responsive to other functions involving engine power level, such as engine torque (which may for example be sensed by measuring pump oil pressure in some cases) or airspeed, or total fuel flow to the engine, as limits. In addition to providing maximum power limits, the servo system of the present invention could include arrangements for also increasing fuel flow to maintain a predetermined airspeed, turbine fan rotation speed, torque level or the like; and the system could use one parameter for one phase of operation such as "take-off" and another for another phase of operation, such as "economy cruise". It has also been shown how changing limits may be imposed on the system, for example when the anti-ice systems are turned on. Similarly, when other changes in operating conditions occur, such as when the thrust reversers are deployed to slow down the aircraft, special appropriate power limits may be imposed.

It is to be understood that the foregoing detailed description and the accompanying drawings are illustrative of the principles of the invention. Other implementations of the invention may be accomplished without departing from the spirit and the scope of the invention. Thus, by way of example, and not of limitation, the circuit could be implemented by a full digital system, without using the analog implementation for the maps and pilot command fan speed as employed at selected points in the present circuitry. In addition, instead of the precise number of pushbuttons which are employed, a slightly greater or lesser number could be used. Also, of course the logic functions as implemented by FIGS. 7A and 7B could be implemented by other specific logic circuits to accomplish the same "logical" results. Accordingly, the present invention is not limited to that precisely as shown and described hereinabove.

What is claimed is:

1. A turbine engine power management and control system for limiting the maximum speed of rotation of a turbine engine, wherein the maximum permissible speed is a function of temperature, and pressure among other factors, comprising:

means for sensing the air pressure in the vicinity of the jet engine;

means for sensing the temperature in the vicinity of the jet engine;

means for measuring the speed of rotation of at least one section of said engine;

first and second system means for determining at least two distinctly different respective "Maps" relating maximum jet engine rotational speed to pressure and temperature, each said system means including: (a) circuit means for determining a maximum allowable rotational speed which increases with increasing temperature at lower temperature ranges; (b) means for increasing the maximum allowable rotational speed with increasing altitude and reduced pressure; (c) means for reducing the maximum allowable speed with increasing temperature at higher temperature levels; and (d) means for limiting the allowable speed to a predetermined maximum absolute limit, regardless of temperature and pressure; to thereby determine a composite maximum allowable speed;

manually operable switching means for selecting one of said two distinctly different "Maps" of maximum allowable rotational speeds; and means for comparing the actual turbine speed of rotation with the selected composite maximum allowable speed and for limiting the actual speed to the vicinity of said selected maximum allowable speed.

2. A turbine engine power management and control system as defined in claim 1 further comprising timing means for automatically shifting from one of said "Maps" to another to limit power levels, after a predetermined period of time, whereby the jet engine is protected against excessive stress by prolonged operation at high power levels.

3. A turbine engine power management and control system for turbine powered aircraft including de-icing equipment, as defined in claim 1, further comprising means for further limiting the maximum speed of rotation of said turbine engines when the aircraft de-icing equipment is turned on.

4. A turbine engine power management and control system for turbine powered aircraft as defined in claim 1 wherein said manually operable switching means is a set of selectable switches mounted on the pilot handwheel of said aircraft.

5. A turbine engine power management and control system as defined in claim 4 further including indicator lights associated with each switch for indicating the mode of energization of said system.

6. A turbine engine power management and control system as defined in claim 4 wherein said switches include individual manually operable selection switches at least for (1) take-off, (2) performance climb, (3) cruise, and (4) approach, power levels.

7. A turbine engine power management and control system as defined in claim 1 wherein said system includes at least three of said "Maps" involving maximum allowable turbine engine rotational speed.

8. A turbine engine power management and control system as defined in claim 4 wherein means are provided for limiting the maximum allowed rotational speed of the turbine engines to a speed below that indicated by any of said "Maps" when selected pushbuttons are activated.

9. A turbine engine power management and control system for fan-jet engines are defined in claim 1, and wherein said system includes means for controlling the speed of the fan section of said turbine engine.

10. A turbine engine power management and control system for multiple engine aircraft as defined in claim 1, wherein separate means are provided for sensing the speed of rotation of each engine, and for separately limiting the speed of rotation of each engine.

11. A turbine engine power management and control system for limiting the maximum speed of rotation of a turbine engine, wherein the maximum permissible speed is a function of temperature, and pressure among other factors, comprising:

means for sensing the air pressure in the vicinity of the jet engine;

means for sensing the temperature in the vicinity of the jet engine;

means for measuring the speed of rotation of at least one section of said engine;

first and second system means for determining at least two distinctly different respective "Maps" relating maximum jet engine rotational speed to pressure and temperature, each said system means including: (a) circuit means for determining a maximum allowable rotational speed which increases with increasing temperature at lower temperature ranges; (b) means for increasing the maximum allowable rotational speed with increasing altitude and reduced pressure; (c) means for reducing the maximum allowable speed with increasing temperature at higher temperature levels; and (d) means for limiting the allowable speed to a predetermined maximum absolute limit, regardless of temperature and pressure; to thereby determine a composite maximum allowable speed;

manually operable switching means for selecting one of said two distinctly different "Maps" of maximum allowable rotational speeds;

means for comparing the actual turbine speed of rotation with the selected composite maximum allowable speed and for limiting the actual speed to the vicinity of said selected maximum allowable speed; and timing means for automatically shifting from one of said "Maps" to another to limit power levels, after a predetermined period of time, whereby the jet engine is protected against excessive stress by prolonged operation at high power levels.

12. A turbine engine power management and control system for limiting the maximum speed of rotation of an aircraft turbine engine, wherein the maximum permissible speed is a function of temperature, and pressure among other factors, comprising:

means for sensing the air pressure in the vicinity of the jet engine;

means for sensing the temperature in the vicinity of the jet engine;

means for measuring the speed of rotation of at least one section of said engine;

first and second system means for determining at least two distinctly different respective "Maps" relating maximum jet engine rotational speed to pressure and temperature, each said system means including: (a) circuit means for determining a maximum allowable rotational speed which increases with increasing temperature at lower temperature ranges; (b) means for increasing the maximum allowable rotational speed with increasing altitude and reduced pressure; (c) means for reducing the maximum allowable speed with increasing temperature at higher temperature levels; and (d) means for limiting the allowable speed to a predetermined maximum absolute limit, regardless of temperature and pressure; to thereby determine a composite maximum allowable speed;

manually operable switching means for selecting one of said two distinctly different "Maps" of maximum allowable rotational speeds, said manually operable switching means comprising pushbutton switches mounted on the pilot handwheel of the aircraft; and means for comparing the actual turbine speed of rotation with the selected composite maximum allowable speed and for limiting the actual speed to the vicinity of said selected maximum allowable speed.

13. A turbine engine power management and control system for limiting the maximum speed of rotation of an aircraft turbine engine, wherein the maximum permissible speed is a function of temperature, and pressure among other factors, comprising:

means for sensing the air pressure in the vicinity of the jet engine;

means for sensing the temperature in the vicinity of the jet engine;

means for measuring the speed of rotation of at least one section of said engine;

first and second system means for determining at least two distinctly different respective "Maps" relating maximum jet engine rotational speed to pressure and temperature, each said system means including: (a) circuit means for determining a maximum allowable rotational speed which increases with increasing temperature at lower temperature ranges; (b) means for increasing the maximum allowable rotational speed with increasing altitude and reduced pressure; (c) means for reducing the maximum allowable speed with increasing temperature at higher temperature levels; and (d) means for limiting the allowable speed to a predetermined maximum absolute limit, regardless of temperature and pressure; to thereby determine a composite maximum allowable speed;

manually operable switching means for selecting one of said two distinctly different "Maps" of maximum allowable rotational speeds, said manually operable switching means comprising pushbutton switches mounted on the pilot handwheel of the aircraft;

means for comparing the actual turbine speed of rotation with the selected composite maximum allowable speed and for limiting the actual speed to the vicinity of said selected maximum allowable speed; and timing means for automatically shifting from one of said "Maps" to another to limit power levels, after a predetermined period of time, whereby the jet engine is protected against excessive stress by prolonged operation at high power levels.

14. An aircraft turbine engine power management and control system for limiting the power level of a turbine engine, wherein the maximum permissible power level is a function of temperature, and pressure among other factors, comprising:

means for sensing the air pressure in the vicinity of the turbine engine;

means for sensing the temperature in the vicinity of the turbine engine;

means for measuring at least one parameter which is a function of the power level of said engine;

first and second system means for determining at least two distinctly different respective "Maps" relating maximum turbine engine power level to pressure and temperature, each said system means including means for limiting the power level parameter to a predetermined maximum absolute limit, regardless of temperature and pressure to thereby determine a composite maximum allowable speed;

manually operable switching means for selecting one of said two distinctly different "Maps" of maximum allowable power levels; and means for comparing the actual power level parameter with the selected composite maximum allowable power level and for limiting the turbine engine power level to the vicinity of said selected maximum allowable power level.

15. A turbine engine power management and control system for turbine powered aircraft including special aircraft operating equipment, as defined in claim 14, further comprising means for further limiting the maximum power level of said turbine engines when the aircraft special operating equipment is in operation.

16. An aircraft turbine engine power management and control system for limiting the power level of a turbine engine, wherein the maximum permissible power level is a function of temperature, and pressure among other factors, comprising:

means for sensing the air pressure in the vicinity of the turbine engine;

means for sensing the temperature in the vicinity of the turbine engine;

means for measuring at least one parameter which is a function of the power level of said engine;

first and second system means for determining at least two distinctly different respective "Maps" relating maximum turbine engine power level to pressure and temperature, each said system means including means for limiting the power level parameter to a predetermined maximum absolute limit, regardless of temperature and pressure to thereby determine a composite maximum allowable speed;

manually operable switching means for selecting one of said two distinctly different "Maps" of maximum allowable power levels;

means for comparing the actual power level parameter with the selected composite maximum allowable power level and for limiting the turbine engine power level to the vicinity of said selected maximum allowable power levels; and timing means for automatically shifting from one of said "Maps" to another to limit power levels, after a predetermined period of time, whereby the jet engine is protected against excessive stress by prolonged operation at high power levels.

17. A turbine engine power management and control system for turbine powered aircraft including special aircraft operating equipment, as defined in claim 16, further comprising means for further limiting the maximum power level of said turbine engines when the aircraft special operating equipment is in operation.

* * * * *